United States Patent
Renken et al.

(10) Patent No.: US 7,479,776 B2
(45) Date of Patent: *Jan. 20, 2009

(54) HAND-HELD TESTER AND METHOD FOR LOCAL AREA NETWORK CABLING

(75) Inventors: Gerald W. Renken, Carlsbad, CA (US); Keith H. Davis, San Diego, CA (US); Edward Pivonka, Rancho Santa Fe, CA (US)

(73) Assignee: IDEAL Industries, Inc., Sycamore, IL (US)

( * ) Notice: Subject to any disclaimer, the term of this patent is extended or adjusted under 35 U.S.C. 154(b) by 762 days.

This patent is subject to a terminal disclaimer.

(21) Appl. No.: 11/042,003

(22) Filed: Jan. 24, 2005

(65) Prior Publication Data

US 2005/0174949 A1    Aug. 11, 2005

Related U.S. Application Data

(63) Continuation-in-part of application No. 10/317,555, filed on Dec. 12, 2002, now Pat. No. 6,847,213.

(51) Int. Cl.
*G01R 19/00* (2006.01)
*G01R 31/02* (2006.01)
*G01R 35/00* (2006.01)
*G01R 27/02* (2006.01)

(52) U.S. Cl. .................. 324/66; 324/539; 324/601; 324/643

(58) Field of Classification Search ............... 324/66, 324/539, 601, 543
See application file for complete search history.

(56) References Cited

U.S. PATENT DOCUMENTS

| 6,847,213 B2 * | 1/2005 | Renken et al. ............... 324/628 |
| 2004/0051538 A1 * | 3/2004 | Adamian .................... 324/601 |
| 2005/0027469 A1 * | 2/2005 | Brunsman ................... 702/117 |
| 2005/0256658 A1 * | 11/2005 | Anderson .................... 702/90 |

* cited by examiner

Primary Examiner—Diego Gutierrez
Assistant Examiner—Amy He
(74) Attorney, Agent, or Firm—Cook Alex Ltd.

(57) ABSTRACT

A LAN tester has display and remote units each having a connector jack attached to an adapter board for connection to the plug of a patch cord. Both the display and remote units have circuits which are capable of measuring the phase between a drive signal voltage and the corresponding coupled or reflected signal due to the drive signal. Scattering parameters for the mated connector pairs and the patch cord itself are measured during a field calibration. A computer in one or both of the tester units stores the measured scattering parameters and uses the scattering parameters to move the reference plane to any desired location along the patch cord. Channel link or permanent link tests can be conducted using the same equipment.

15 Claims, 11 Drawing Sheets

Fig. 19 LAN Tester Digital Control Circuit Block Diagram

Fig. 20 LAN Tester Analog Circuit Block Diagram

Fig. 21 LAN Tester Detailed Phase Measurement Block Diagram

HAND-HELD TESTER AND METHOD FOR LOCAL AREA NETWORK CABLING

CROSS REFERENCE TO RELATED APPLICATION

This is a continuation-in-part of application Ser. No. 10/317,555 filed Dec. 12, 2002 now U.S. Pat. No. 6,847,213.

BACKGROUND OF THE INVENTION

Local area network (LAN) cabling is used to connect equipment such as personal computers, printers and fax machines that pass information between them using high-speed digital signals. This type of high performance cabling is sometimes referred to as telecommunications cable. Since an office contains many computers, computer file servers, printers, and fax machines, the LAN cabling interconnects all of this equipment into a communications network. LAN cabling has been designed to support telecommunication between all of the individual elements of the network.

FIG. 1 shows an example of LAN cabling, in a simplified drawing. FIG. 1 shows how the LAN cabling, most of which runs within the building walls, is used to connect the personal computer 1 at someone's desk to the file server 2 in the telecommunications room. The maximum length of cable 3 inside the wall cannot exceed 90 meters. Wall jack connectors 4 are used to connect the cords 5 from the computer and file server to the LAN cabling.

Cabling: Cabling is an important word in the term LAN cabling because cabling includes the connectors 4 placed on the LAN cable as well as the cable 3 itself. Thus, the performance of the LAN cabling depends upon the connectors as well as the cable.

Installation: Technicians install the LAN cabling as a part of new construction or as part of a LAN performance upgrade in existing structures. In either case, the technicians pull the LAN cable 3 through the walls and then place the connecting jacks 4 on the ends of the cable. The jacks are then snapped into the wall jack mounting plate and the installation is complete.

However, the technician is then required to test each LAN cabling run or link with calibrated test equipment. This testing certifies to the general contractor that the cabling run has been correctly installed from the standpoint of signal integrity. Hand-held LAN testers are used to perform these tests. The testers drive the cabling with a series of different signal types and from measurements of the received signals, determine if the cabling is capable of supporting the telecommunication signals at the prescribed data rate.

The LAN testers record the results of each test and, at a later time, print out a test document indicating that the link passed or failed. The technician gets paid for the links that pass. If there are links that fail, the technician must re-test, and often replace connectors that have been incorrectly or improperly installed. The technicians keep testing and repairing the links until they all pass.

LAN Testers: LAN testers are fairly sophisticated hand-held test systems, which can test LAN links with a series of tests covering a frequency range of 1 to 250 MHz, in the case of TIA Category 6 cabling. FIG. 2 shows a typical LAN tester 6, with a test adapter circuit board 7 connected to the LAN tester. The test adapter circuit board includes a test jack connector 8. The purpose of this test adapter is to provide a connection interface between the LAN tester and the LAN link to be tested.

The test jack 8 allows the LAN tester 6 to connect to the LAN link with a patch cord 9, as shown in FIGS. 3 and 4. Typical lengths for patch cords are two meters, or approximately six feet. This length allows the technician to conveniently connect the LAN tester to the wall jacks 4 during test runs.

Standards: Technicians test their installed links with reference to telecommunication industry standards. In the United States the standard is specified by the TIA or Telecommunications Industry Association. In Europe the standard comes from ISO, or International Standards Organization. When testing a link, the technician selects which type of link is being tested and the corresponding sets of measurement limits, whether from TIA or ISO.

The link is tested and the measured results are compared to limits from the specified standard. If no limits are exceeded, the link passes. If not, then the link fails and the technician must work on the failed link, as required, until it passes. Often this means reinstalling the connectors on the ends of the cable.

Standard Link Definitions: FIG. 5 shows the standard permanent link, in simplified form, with 90 meters of LAN cable, running within a structure's wall, or overhead in the ceiling. The wall jacks, attached to the cabling ends, are used to connect the link with equipment in the telecommunications room and to individual items such as computers or printers within the office's local area network. The TIA and ISO specify the length of 90 meters as the maximum length for the permanent link.

Link Testing: FIG. 6 illustrates how the LAN testers check the performance of a link. When testing a link (a procedure known in the industry as "shooting" a link), two LAN testers are required as shown. The technician connects a display end LAN tester 6A at one end of the link, and the remote end LAN tester 6B at the other end of the link. Since the display end LAN tester has a display screen to show the measurement test results, the technician shoots the link from the display end, controlling the test from there, and viewing the test results.

During the test, first one unit applies test signals to one end of the link while both units measure the results. Then the roles are reversed with the signal application and signal measurement taking place at the opposite ends of the link. When the test is complete, the remote unit sends its data measurement files to the display unit for final processing and storage within the display unit. The limits for each test, specified by the selected standard, are applied to the measurement data set to determine if the link passed or failed the certification test.

Standard Links: Both the TIA and ISO have defined two types of LAN links, the channel link and the permanent link. Each link is shown and discussed below.

Channel Link: The channel link includes the LAN link and the patch cords, as shown in FIG. 7, but does not include the connection to the channel test adapter boards 7A. The channel link measurement path includes the link 3 inside the walls, the mated connector pairs at the walls and the patch cords and is supposed to represent the performance of the final, complete telecommunications link, which also uses patch cords to connect the personal computers and file servers to each other. Since there is a longer length of cabling in this path, the test limits for the channel link are not as stringent as those for the permanent link.

Permanent Link: The permanent link includes the link 3, plus the mated connector pairs at the wall jack, but it does not include the patch cord, as shown in FIG. 8. Nor does it include the connection to the permanent link test adapter board 7B. The permanent link test evaluates only the cable within the walls, the connector jacks at the wall, the plugs that are inserted into the jacks, and two centimeters of cable that is attached to each of the plugs. The permanent link test essentially represents the performance of just the link cabling within the walls. Consequently, the permanent link test limits are the tightest measurement limits to pass.

As a result, technicians are often told that if their link fails the permanent link test, to change over the LAN tester limits to channel link limits and re-test. If the channel test passes, the link may then be considered to pass under these conditions.

Consideration will now be given to the test issues faced by the technicians as they test their installed Local Area Network (LAN) cabling for compliance with the appropriate TIA or ISO measurement test limits. The technician will certify the installed link to either permanent or channel link measurement limits. It is assumed that the technician has performed steps necessary to calibrate the test equipment in the field before the LAN certification test to assure maximum LAN tester measurement accuracy.

Permanent Link Testing Issues

1. Permanent Link Adapter Construction: Note the prior art permanent link test adapters 7B shown in FIG. 8. Keep in mind the permanent link comprises the cable in the wall plus the mated connector pair at the wall jacks, but it does not include most of the patch cord. The permanent link adapters (PLA's) are typically fabricated by cutting a patch cord in half, and then soldering each of the cut patch cord ends to a printed circuit board (PCB) within the permanent link test adapter housing. These PCB's are designed to cause very little signal integrity problems so that their effects are ignored.

2. Permanent Link Testing Lifetime: Permanent link adapters have a limited test lifetime due to mechanical flexing of the patch cord as it enters the PLA housing. When the patch cord has been flexed beyond its maximum number of flexures, it will require replacement. When this happens, the entire PLA has to be replaced. In addition, for maximum test accuracy, both PLA's, the one at the display end and the one at the remote end should be replaced.

3. Dedicated PLA: The LAN testers often use a dedicated PLA for each permanent link tested. This is because the circuit and transmission line properties of the patch cord can be an important part of the overall PLA measurement result. The installation technician needs to be aware of what link he or she is testing, who made the cabling, and what is the preferred type of PLA to use.

4. Matched PLA Sets: Usually the technician will use a set of PLA's matched to the cable type, by vendor, which is used in the link. If the link is made with cabling, (that is, cable plus connectors), from Vendor X, then a PLA made from Vendor X patch cords will be used for the certification test.

5. PLA Cost: The PLA's can be a costly item for the installers, often $400 or more for a set of two. If the LAN cabling installation testing company has several installers, each requiring several different sets of vendor specific PLA's, this overhead item can be rather costly. The cost comes from a dedicated printed circuit board, within a plastic housing, to form the structure of the PLA, which connects to the LAN tester.

6. PLA Cross-talk: In addition, as LAN certification moves to frequencies above 250 MHz, the performance of the PLA's as a part of the measurement system becomes more critical. The measured cross talk or lack of isolation between conductor pairs within the PLA connection circuit board becomes a serious issue as frequencies increase. When the isolation degrades beyond a certain level, the LAN tester cannot measure the cabling pair-to-pair isolation because it cannot "see" past its own PLA generated crosstalk.

The present invention provides the solution to this problem. The solution is to use a connector with proven isolation properties on the test adapter board, and then to connect to that test adapter board with a patch cord having a connector which mates to the connector on the adapter board.

7. PLA Reference Plane Calibration: The last issue with permanent link adapters is that of the measurement reference plane location. The purpose of permanent link calibration is to refer all permanent link measurements to a known point along the patch cord. In particular, the permanent link measurement reference plane is calculated to set this point at the end of the patch cord, 2 centimeters from the wall jack. From this calibration, all effects from the patch cord are removed from the permanent link measurement. The calibration procedure used to define and set this reference plane at this point can involve taking an initial set of permanent link calibration data and finally referring it to this desired reference plane.

Channel Link Testing Issues

1. Channel Link Adapters: Note the channel link test adapters 7A shown in FIG. 7. Keep in mind the channel link includes the link (i.e., the cable in the wall plus the mated connector pairs at the wall jacks) and the patch cords but it does not include either the plugs or the jacks at the channel test adapter boards. The channel link adapters (CLA's) are fabricated by placing a right-angle connector with appropriate isolation on the printed circuit board mounted within the CLA housing. The right angle connector is selected to provide significant pair-to-pair isolation when mated with the patch cord used for the channel link certification.

2. CLA Testing Lifetime: Channel link adapters have a much longer test lifetime when compared to permanent link test adapters since the use of low cost replaceable patch cords solves the patch cord mechanical flexure problem. The connector mounted on the printed circuit board inside the CLA eventually wears out as the cladding on the contacts wears off. Nevertheless, the testing lifetime for the channel link adapter is considerably longer than that for the permanent link adapter.

3. Dedicated CLA: The LAN testers also use a dedicated CLA when testing channel links since low cross talk, high isolation connectors 8 are used on the channel link adapter printed circuit board.

4. Matched CLA Sets: Matched CLA sets are used by definition by virtue of the high isolation right angle printed circuit board connectors mounted on the PCB within the CLA housing. However, when compared to the PLA, any type of patch cord can be used with the CLA, so long as the patch cord is compliant with the cabling category used for the link under test.

5. CLA Cost: The CLA's are less costly than PLA's, since they can use any compliant patch cord to connect to and test the channel link.

6. CLA Cross-talk: The channel link pair-to-pair isolation is superior to that of the permanent link by virtue of the low crosstalk connector used within the CLA module housing.

7. CLA Reference Plane Calibration: The last issue with channel link adapters is also that of the measurement reference plane location. In particular, the channel link measurement reference plane is set at the end of the patch cord connector right at the input end of the patch cord, as shown in FIG. 7. With this calibration, all effects from the patch cord input connector (i.e., the plug at the tester end) are removed from the channel link measurement.

LAN Link Measurement Issue Summary

From the preceding discussion, when compared to channel link adapters, permanent link measurements require the use of a separate set of permanent link adapters, which add an undesirable set of costs in terms of: 1) the permanent link adapters themselves; 2) the number of dedicated PLA sets; and 3) limited PLA test lifetime due to patch cord flexure failure. Permanent link adapters also have more problems with minimizing pair-to-pair crosstalk when compared to channel link adapters.

SUMMARY OF THE INVENTION

For these reasons, in the present invention a calibration/measurement method is proposed the objectives of which are to:

1. eliminate completely the permanent link test adapter;
2. reduce LAN measurement overhead support costs;
3. improve signal integrity;
4. increase LAN link measurement accuracy at frequencies above 300 MHz, and
5. provide a means to measure permanent links using channel adapters and low cost patch cords.

Phase

Preparatory to a description of the method of the present invention, a discussion of phase needs to be presented. The capability of phase measurement is a key attribute of the LAN tester of the present invention. That is, in addition to magnitude, the hand-held LAN tester of this invention can measure phase. This capability permits the tester to set a measurement reference plane at one specified point along the LAN link to be measured. The original calibration reference plane may be set at a point along the link at a point, which is easy to set, measure, define and implement.

Phase also allows the tester to easily move this original calibration reference plane and all of its associated LAN link measurements to another, new, reference plane location at any time during the LAN link testing. Specifically, with phase information, a display end and remote end can each move the phase reference plane from within the channel link adapter printed circuit board, through the mated pair of connectors at the CLA output and anywhere down the length of the patch cord, and up to the mated pair of connectors at the wall jack, in any of the four possible locations as shown in FIG. 9. Movement of the phase reference plane enables the tester of this invention to use a channel link adapter and low cost patch cord to perform permanent link measurements.

In brief, the method involves the calibration step of measuring the overall scattering parameters $S_T$ for each of the patch cords plus mated connectors pairs at each end of the patch cords, as indicated in FIG. 10. The scattering parameters $S_B$ of each patch cord can be obtained from known characteristics of the cord. This, together with the total scattering parameter matrix $S_T$ allows calculation of the scattering parameters $S_A$ and $S_C$ of the mated connector pairs at the ends of the cords. With the scattering matrices of the mated connector pairs $S_A$ and $S_C$ and the patch cord $S_B$ known, the reference plane may be moved anywhere along the cord from within the LAN tester to perform either permanent link or channel link tests.

DETAILED DESCRIPTION OF THE INVENTION

Figure 1:
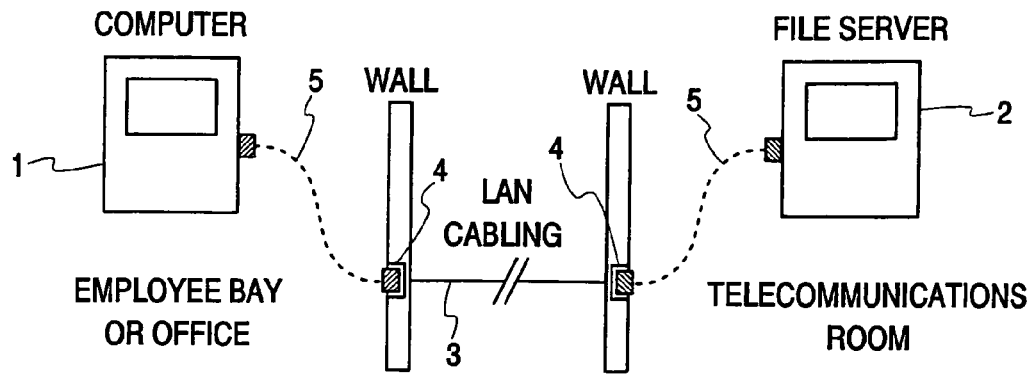
FIG. 1 is a diagrammatic sketch of a LAN cabling connection from a work area to a telecommunications room.
Figure 2:
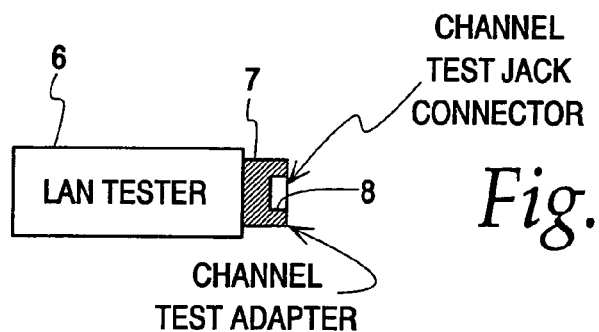
FIG. 2 is a diagram of a prior art LAN tester with a test adapter and test jack.
Figure 3:
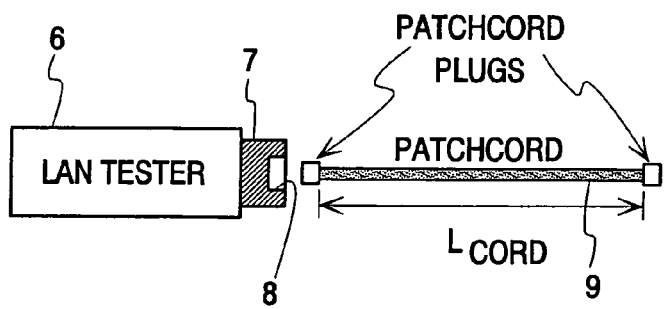
FIGS. 3 and 4 illustrate a prior art LAN tester connection with a patch cord.
Figure 4:
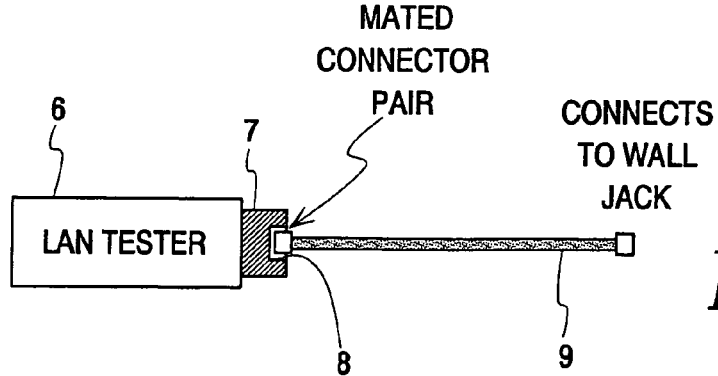
Figure 5:
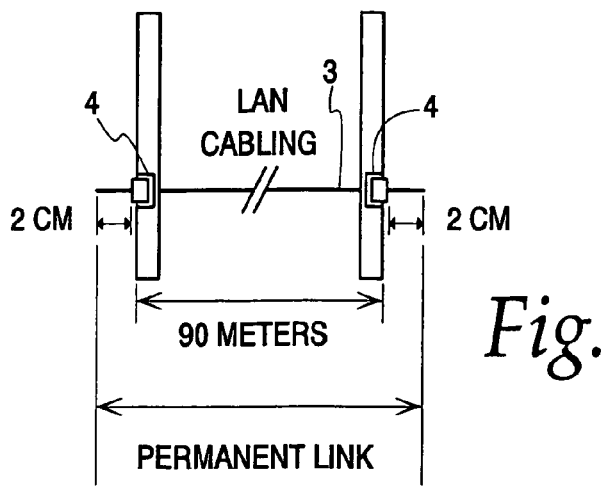
FIG. 5 illustrates a standard 90 meter link.
Figure 6:
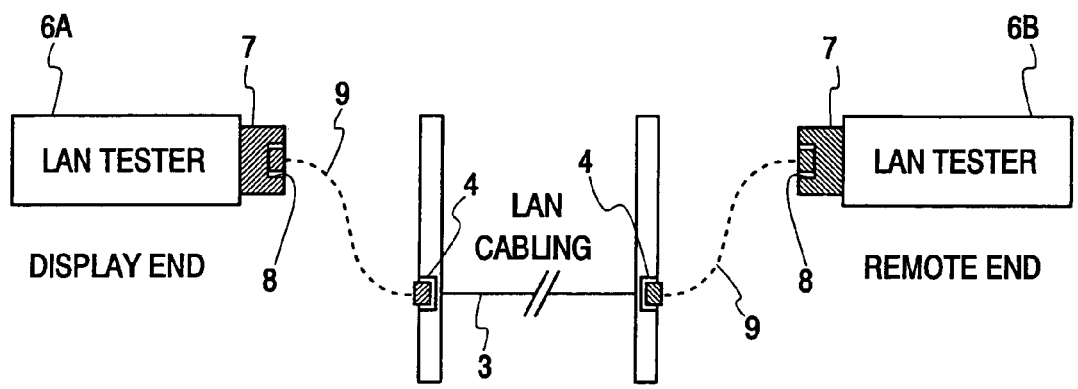
FIG. 6 illustrates the process for testing or "shooting" a link with LAN testers.
Figure 7:
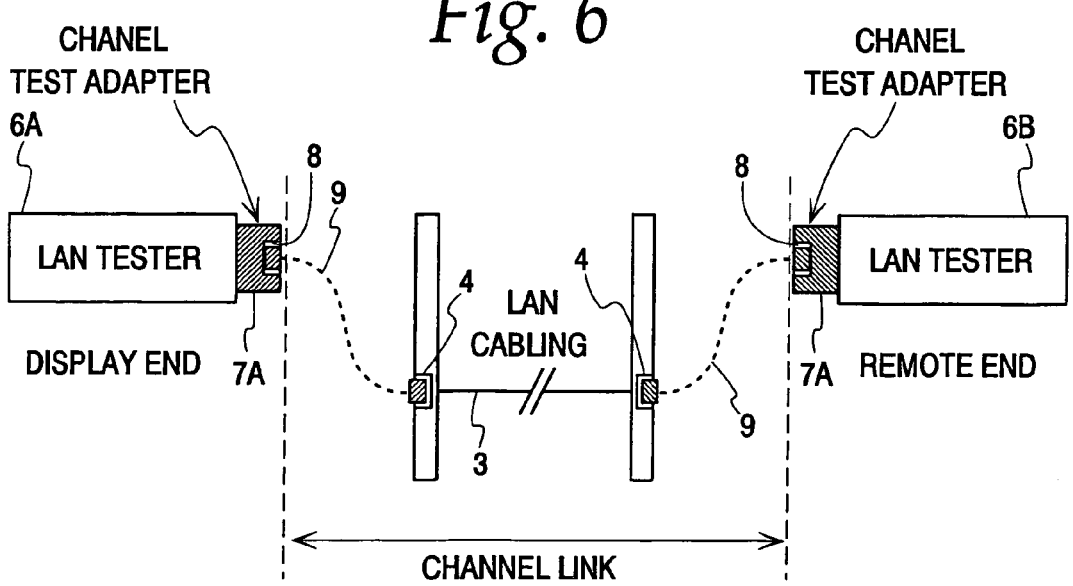
FIG. 7 illustrates a channel link configuration.
Figure 8:
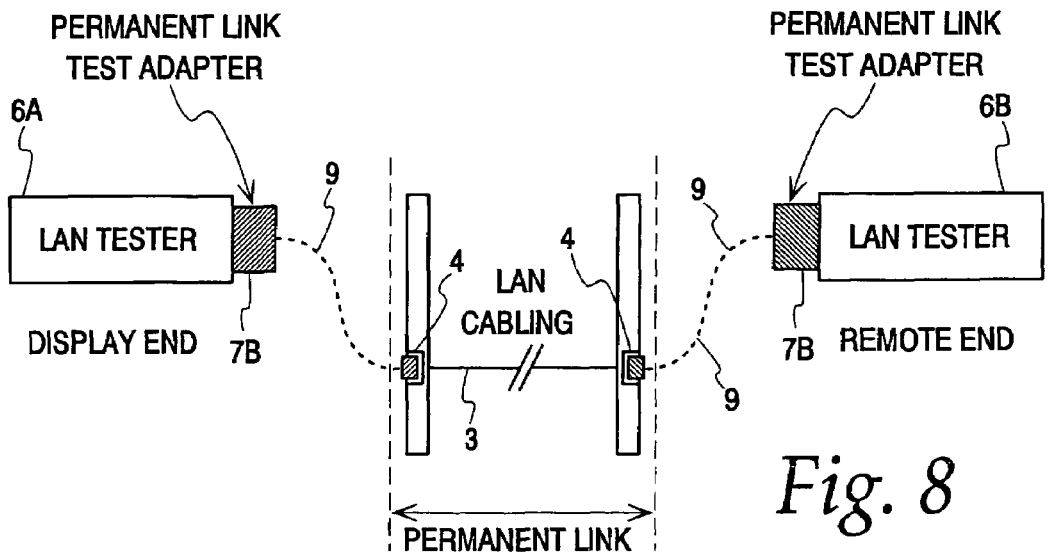
FIG. 8 illustrates a permanent link configuration.
Figure 9:
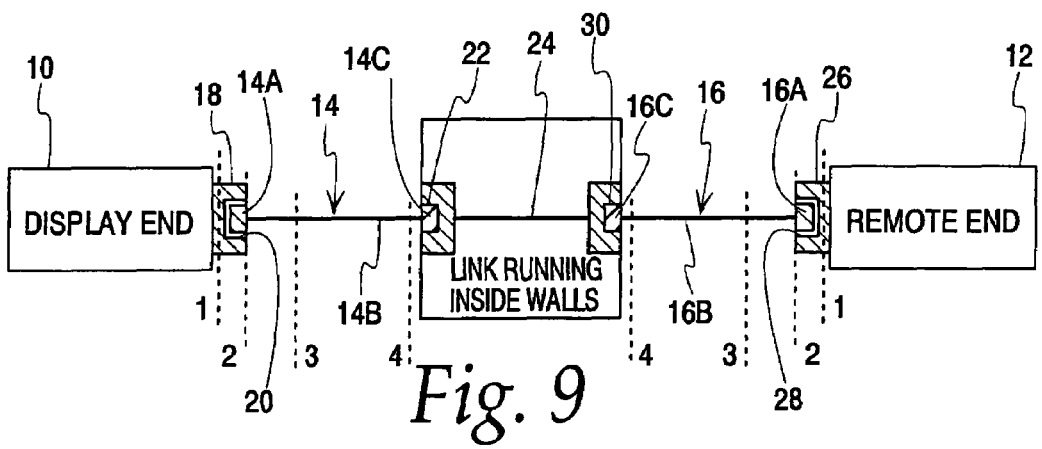
FIG. 9 illustrates movement of the measurement reference plane with phase, as taught by the present invention.

A schematic representation of the LAN testing system of the present invention is shown in FIG. 9. The testing systems includes a hand-held display unit 10, a hand-held remote unit 12 and first and second patch cords 14 and 16. Each patch cord comprises a first plug 14A, 16A at one end, the actual cable 14B, 16B and a second plug 14C, 16C at the other end. The display unit 10 has a channel link adapter board 18 on which is mounted a first connector jack 20. The jack is exposed to the exterior of the display unit. Jack 20 can receive the plug 14A or 16A of a patch cord to form a first mated connector pair. When shooting a link, the other plug 14C, 16C of the patch cord mates with a wall jack 22 attached to the link 24 running inside the walls. The remote unit 14 similarly has a channel link adapter board 26 on which is mounted a second connector jack 28. Both of the connectors 20 and 28 are preferably right-angle connectors with appropriate pair-to-pair isolation. An RJ-45 jack or a Siemon terra jack for higher frequencies are suitable. Jack 28 receives the plug 16A of the second patch cord to form a second mated connector pair. When shooting a link, plug 16C of the second patch cord 16 connects to a wall jack 30 on the end of the link 24. The display and remote units contain appropriate radio frequency and electronic circuitry for testing the link. The display unit also has user-actuated switches for starting and controlling the testing functions, as well as a display that communicates to the user whatever data is appropriate. The display unit also has a computer processor for performing the calculations described below, and memory to store measured scattering parameters and other data.

Figure 10:
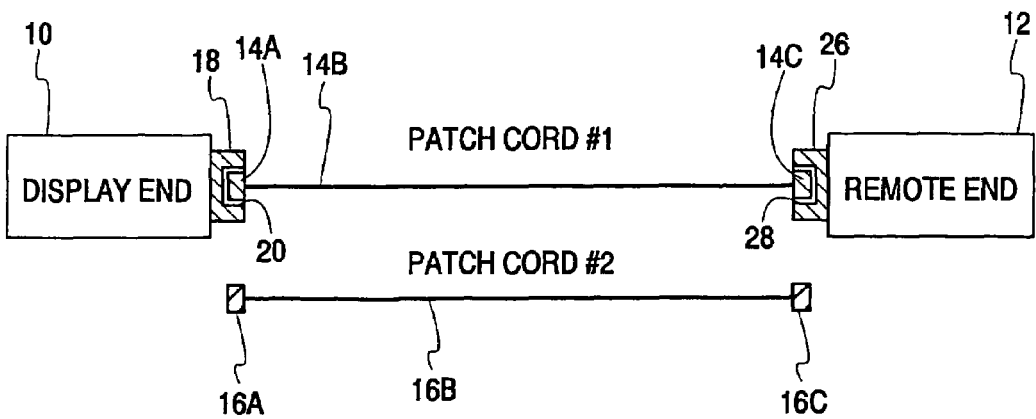
FIG. 10 illustrates the LAN testers of the present invention.

Operation of the LAN testing system is as follows. First a field calibration with the display and remote units and both patch cords must be performed. The object of this calibration is to set a measurement reference plane for the display unit and the remote unit by using any two patch cords with a set of channel link adapters connected to the display and remote units as shown in FIG. 10. The two patch cords should be made by the same vendor with identical plugs on each end, but they do not have to be the same length.

Scattering Parameters

Since the display and remote units can measure phase, the complete patch cord consisting of the patch cord plugs and the patch cord itself can be measured or characterized by measuring their frequency response with scattering, or [S] parameters. From factory calibration, the measurement reference plane on the channel adapter printed circuit board will be at the input to the right-angle connector jacks 20, 28 on the channel link adapter boards 18, 26.

Measurement Steps:

1. Connect patch cord 14 between the two units.
2. Measure all four scattering parameters of the first patch cord 14, so connected, including the mated connector pairs 20,14A and 28,14C at each channel link adapter board 18, 26.
3. Save the total, measured scattering data $[S_T]_1$ for the first patch cord 14
4. Connect the second patch cord 1-6 between the two units.
5. Measure all four scattering parameters of the second patch cord 16, so connected, including the mated connector pairs 20,16C and 28,16A at each channel link printed circuit board 18, 26.
6. Save the total, measured scattering data $[S_T]_2$ for the second patch cord 16.

Calculation Steps

1. The elements for the scattering matrix, for each of the patch cords, are a set of simple equations or terms, with known formulation as follows:

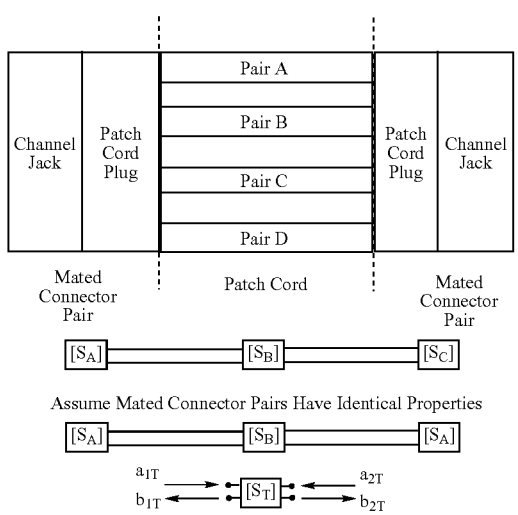

As a 2-port example, consider: $j:=\sqrt{-1}$ $c:=3\cdot 10^8$ M/second

Assume Values for Input Mated LAN Connector Pair A Matrix-$[S_A]$ $$SA_{1,1} := 0.0400 + 0.01 \cdot j \quad SA_{1,2} := 0.3 - 0.1 \cdot j$$

$$SA_{2,1} := SA_{1,2} \quad SA_{2,2} := \overline{SA_{1,1}} \quad SA_{2,2} = 0.04 - 0.01i$$

$$SA := \begin{pmatrix} SA_{1,1} & SA_{1,2} \\ SA_{2,1} & SA_{2,2} \end{pmatrix} \quad SA = \begin{pmatrix} 0.04 + 0.01i & 0.3 - 0.1i \\ 0.3 - 0.1i & 0.04 - 0.01i \end{pmatrix}$$

$$det\_A := SA_{1,1} \cdot SA_{2,2} - SA_{1,2} \cdot SA_{2,1}$$

Patch Cord Matrix-$[S_B]$ (Assume that the line is a perfect match)

$$L := 2 \text{ Meters} \quad \text{Assume } F = 600 \text{ MHz}, NVP = 0.75 \quad \alpha := 0.002$$

$$F := 600 \cdot 10^6 \quad NVP := 0.75$$

$$\beta := \frac{2 \cdot \pi \cdot F}{c \cdot NVP} \quad \gamma := \alpha + \beta \cdot j \quad \phi := \gamma \cdot L \quad \phi = 4 \times 10^{-3} + 33.51i$$

$$SB_{11} := 0 \quad SB_{12} := e^{-\phi} \quad SB_{21} := e^{-\phi} \quad SB_{22} := 0$$

$$SB := \begin{pmatrix} SB_{11} & SB_{12} \\ SB_{21} & SB_{22} \end{pmatrix} \quad SB = \begin{pmatrix} 0 & -0.498 - 0.863i \\ -0.498 - 0.863i & 0 \end{pmatrix}$$

$$det\_B := SB_{1,1} \cdot SB_{2,2} - SB_{1,2} \cdot SB_{2,1}$$

Output Mated LAN Connector Pair A Matrix-$[S_C]$, (Note Relationships to $[S_A]$)

$$SC_{1,1} := SA_{2,2} \quad SC_{1,2} := SA_{2,1} \quad SC_{2,1} := SA_{1,2} \quad SC_{2,2} := SA_{1,1}$$

$$SC := \begin{pmatrix} SC_{1,1} & SC_{1,2} \\ SC_{2,1} & SC_{2,2} \end{pmatrix} \quad SA = \begin{pmatrix} 0.04 + 0.01i & 0.3 - 0.1i \\ 0.3 - 0.1i & 0.04 - 0.01i \end{pmatrix}$$

for Reference $$SC = \begin{pmatrix} 0.04 - 0.01i & 0.3 - 0.1i \\ 0.3 - 0.1i & 0.04 + 0.01i \end{pmatrix}$$

$$det\_C := SC_{1,1} \cdot SC_{2,2} - SC_{1,2} \cdot SC_{2,1}$$

2. To an acceptable degree of accuracy, the patch cord characteristic impedance Zo is known, and to a very good, first order approximation, may be considered to be Zo=100 Ohms.

3. The electrical length of the patch cord will be known. The length may be specified by the manufacturer of the tester units, or it can be measured by the LAN tester.

4. To an acceptable degree of accuracy, the scattering matrix for the mated jack and plug at each end of the patch cord can be assumed to be identical.

5. Then, using the justifiable assumptions, 1-4 above, and $[ST]_1$, the measured total scattering matrix for the first patch cord 14, the scattering matrix for the mated jack and plug pair at each end of the patch cord can solved for.

6. With the mated connector pair scattering matrix and the scattering matrix for patch cord 14, the measurement reference plane may be moved through the mated connector pair on the printed circuit board. This reference plane location is necessary to perform a channel link test; or the reference plane may be moved further down the patch cord to within 1 or 2 centimeters of the wall jack, in order to perform a permanent link measurement.

7. The same set of measurements and calculations are then made using the second patch cord 16.

8. The scattering parameters for the mated connector pairs are saved for testing throughout the day or until another patch cord set is selected, at which time the field calibration procedure is repeated.

The scattering parameter matrices can be manipulated using linear algebraic calculations to solve for the elements of the mated LAN channel connector scattering matrix. In this set of calculations, a set of scattering parameters for the mated connector pair is assumed, and following established formulation, the complete, total scattering matrix $[S_T]$ is calculated by combining the scattering matrices of the mated connector pair with that of the patch cord transmission line.

Then, with $[S_T]$ as the "given" final, measured result, and with the assumptions for the patch cord transmission line, assumptions 2 and 3 above, plus assumption 4 which assumes identical scattering matrices for the two mated connector pairs, the program solves for the elements of the mated connector pair scattering matrix $[S_A]$.

The program solves for and calculates the same values for $[S_A]$ as were assumed in the original calculation for the total $[S_T]$ matrix. This calculation confirms the mathematical model as correct.

Turning now to a consideration of the phase measurement aspect of the invention, the LAN tester of the present invention measures the relationship between two signals as it tests LAN cabling for compliance with published LAN cabling performance standards. The signal relationships measured by the tester are ratios in magnitude, and include the phase relationship between the two signals. Note that this phase measurement under discussion is the phase between a drive signal voltage and the corresponding coupled or reflected voltage due to that same drive signal. These two signals are measured at a specified reference plane determined by factory or field calibration procedures.

Figure 11:
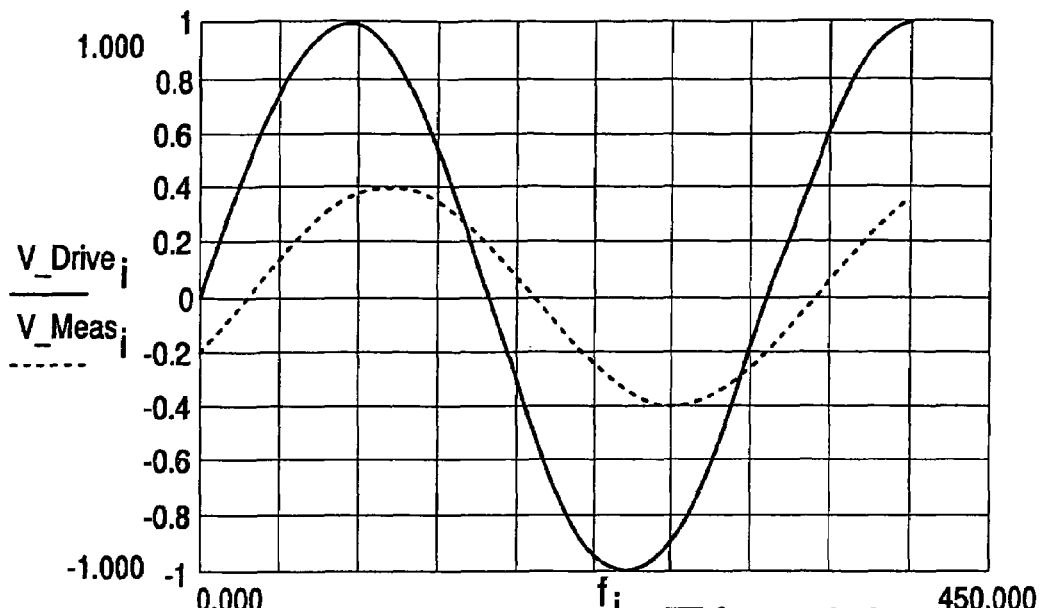
FIG. 11 is a plot of drive signal and a resulting signal measured by the LAN tester of the present invention.

Phase difference can be shown between two sinusoidal signals at the same frequency. In the plot shown in FIG. 11, the V_Drive trace (the solid line) corresponds to the drive signal into the LAN cabling. The V_Meas trace (the dotted line) is the resulting signal to be measured by the LAN tester. Note that the amplitude of V_Meas is 40% of the amplitude of V_Drive. V_Meas also lags V_Drive by 30 degrees of phase. This lagging phase relationship between V_Drive and V_Meas can also be seen in the plot.

If the ratio of V_Meas to V_Drive is calculated, one then calculates, for example, the crosstalk term relating the drive signal on one LAN cable pair and the coupled, crosstalk signal which appears on another LAN conductor pair. When the ratio, V_R=V_Meas/V_Drive is calculated, the |V_R|, the magnitude of V_R=|V_R|=|V_Meas|/|V_Drive|=0.4/1.0=0.4. Thus |V_R|=0.4.

The phase between the two signals must be calculated using one of the signals for the phase reference. In this case, the V_Drive signal is defined to be the reference signal. The phase relationship of V_Meas is then said to lag the reference signal, V_Drive, by 30 degrees of phase. Since a phase angle is involved, the ratio, V_R=V_Meas/V_Drive is a complex number, with a corresponding magnitude, |V_R| and phase angle, $\phi_{\_R}$=−30 degrees. The negative sign on $\phi$_R indicates that V_Meas lags V_Drive by 30 degrees in phase. Thus V_R=0.4/_−30 degrees.

Figure 12:
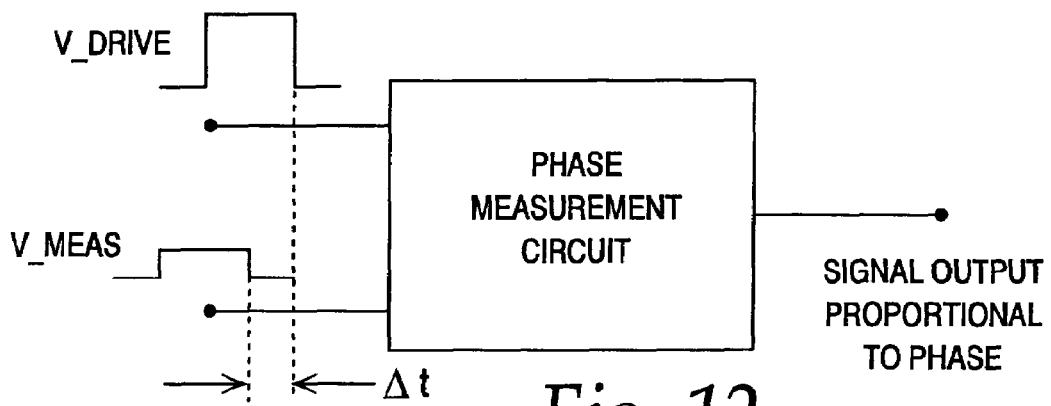
FIG. 12 is an schematic diagram of the phase measurement circuit in a display unit of the present invention.

Phase may also be calculated from the time relationship of two square wave signals, by computing the time difference between two corresponding edges of the square wave signals. This is illustrated in FIG. 12 where the signals travel from left to right. Note in FIG. 12 the two square waves, V_Meas and V_Drive, where the leading edge of V_Meas lags the leading edge of the reference V_Drive square wave by the time difference, Δt. This time difference may be used to calculate the phase between the two signals, by relating Δt to the period, $T_{Clock}$, of a precise reference clock running at frequency, $F_{Clock}$.

$$T_{Clock}=1/F_{Clock}$$

The phase in degrees, $\phi$_R, between these two square waves, is then:

$$\phi\_R=360\times(\Delta t/T_{Clock}) \text{ degrees}$$

The phase measurement circuit determines the value for Δt, and outputs a signal related to the phase between the two square waves, V_Meas and V_Drive. The LAN tester of the present invention uses a programmable gate array to measure Δt.

The LAN tester can measure phase, which needs to be referenced to a measurement reference plane, as discussed below.

1. Set the Measurement Reference Plane Initially—During calibration, the phase measurement capability permits the LAN tester to set, or define a measurement reference plane at one specified point along the LAN link to be measured. This reference plane, defined during the factory calibration procedure, may be set anywhere along the link at any point, to permit measurements which are simple and convenient to make. The calibration procedure is shown in FIG. 13.

Figure 13:
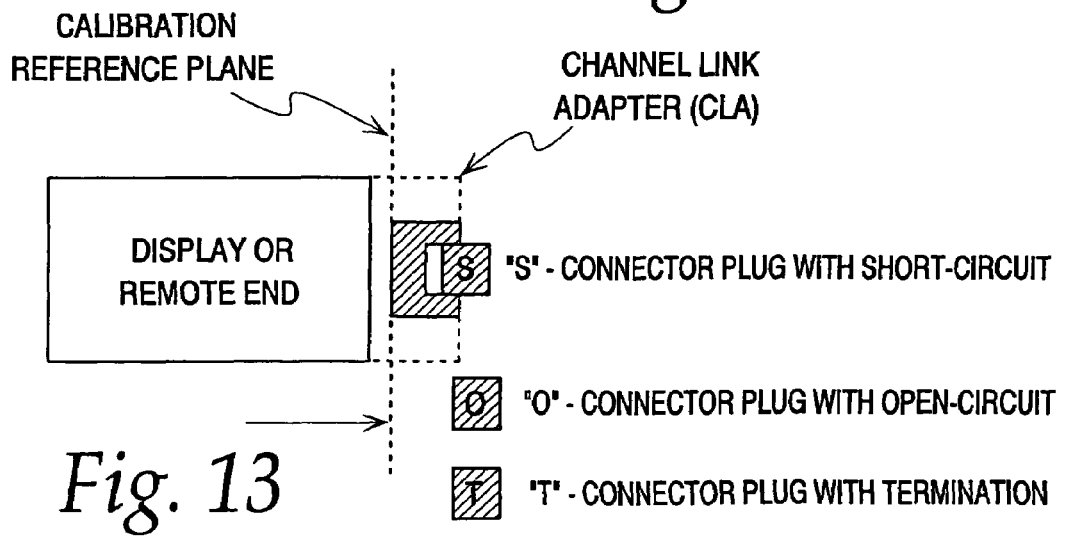
FIG. 13 is an illustration of setting the measurement reference plane during factory calibration, according to the present invention.

The reference plane location is defined or set during initial factory calibration at the display and remote ends with the procedure shown in FIG. 13. Plugs containing short-circuit, open-circuit and terminations are applied in sequence to the jack on the channel link adapter. Swept frequency measurements are taken with each plug connected to the jack. From the measured data, which includes phase information, the display or remote end sets its reference plane at the point looking into the jack on the CLA printed circuit board shown with the dotted line. With this reference plane set at this point, phase information also allows it to be moved from this point, up and down the patch cord.

2. Move the Measurement Reference Plane—Following patch cord field calibration, phase also allows the LAN tester to easily move this original calibration reference plane, during link testing. Phase allows the original reference plane to be moved to a new reference plane location at any time during the LAN link testing. Specifically, with phase information, a display end, and/or remote end can each move their phase reference plane from within the channel link adapter PCB, through the mated pair of connectors at the CLA output, anywhere down the length of the patch cord and up to the mated pair of connectors at the wall jack, in any of the four possible locations as shown in FIG. 9.

2a. Reference plane movement through the mated connector pair from 1 to 2, shown in FIG. 14, on the channel link adapter module is performed using the $[S_{21}]_{Connector\ Pair}$ data measured and calculated for the mated connector pair during patch cord field calibration. This step sets the reference plane for channel link testing.

2b. Reference plane movement down the patch cord from 2 to 3, shown in FIG. 15, moving down the patch cord is performed using the [S]—parameter data measured and calculated for the patch cord during field calibration.

Note that the desired length down the patch cord, $L_{Line}$, from 2 to 3 is expressed in the physical length units of inches. $L_{Line}$, in inches, needs to be converted into equivalent electrical phase length, $\phi_{Line}$ in degrees.

During the patch cord field calibration, the NVP (nominal velocity of propagation) for the patch cord is determined through measurement. From this value, the corresponding electrical phase length, $\phi_{Line}$, moving from 2 to 3 is calculated using:

$$\beta = (360 \times f)/(NVP \times c) \text{ degrees/inch}$$

where:

$c$ = velocity of light in freespace = $1.1811 \times 10^{10}$ inches/second $f$ = signal frequency in Hertz Then $\phi_{Line}$ in degrees is calculated using:

$$\phi_{Line} = L_{Line} \times (360 \times f)/(NVP \times c) \text{ degrees}$$

Figure 16:
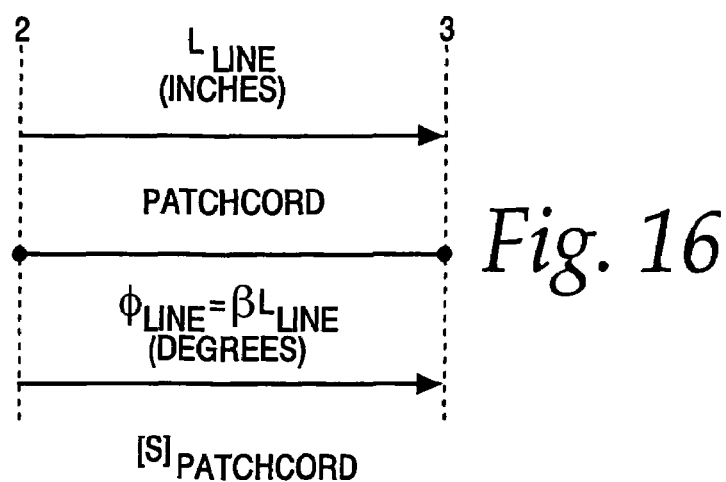
FIG. 16 illustrates how the reference plane at point 2 of FIG. 9 relates to the reference plane at point 3 of FIG. 9.

Relating this formulation to just the patch cord reference planes, moving from 2 to 3 can be seen in FIG. 16.

Figure 14:
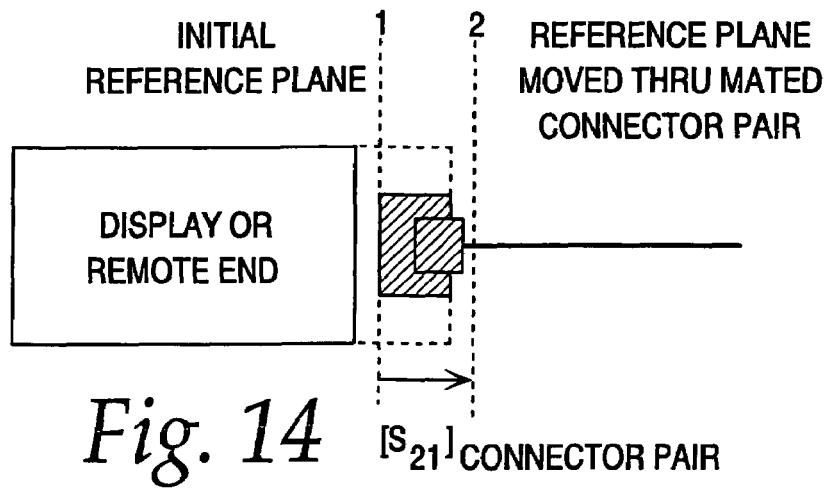
FIG. 14 is an illustration of movement of the reference plane through a mated connector pair.
Figure 15:
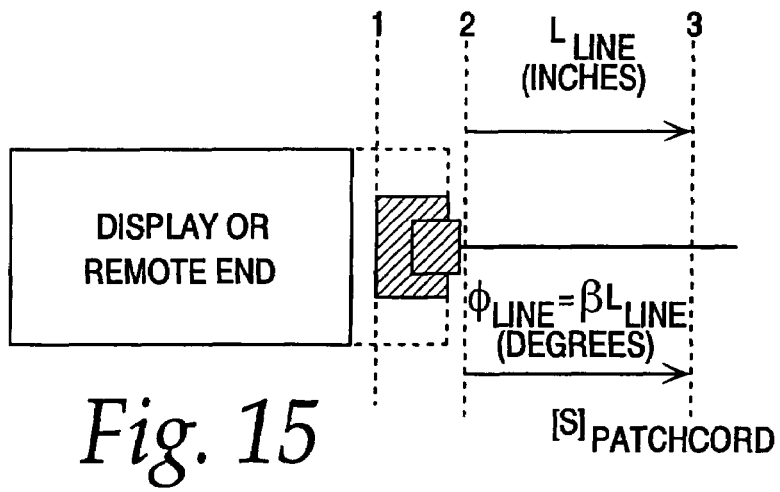
FIG. 15 is an illustration of movement of the reference plane down the patch cord, according to the present invention.

The measured LAN cable data is moved thru the mated connector pair from 1 to 2 using the $[S_{21}]_{Connector\ Pair}$ data as shown in FIG. 14. With reference to FIG. 15, which shows how a patch cord length in inches is related to the equivalent patch cord electrical length in degrees, FIG. 16 relates these terms per the formulation below:

$$[S]_{Patchcord} = \begin{bmatrix} S_{11P} & S_{12P} \\ S_{21P} & S_{22P} \end{bmatrix}$$

For a reasonably well-matched patchcord, this expression becomes:

$$[S]_{Patchcord} = \begin{bmatrix} 0 & e^{-j\phi Line} \\ e^{-j\phi Line} & 0 \end{bmatrix}$$

If the patch cord has characteristic impedance, $Z_{0p}$, not equal to $Z_0 = 100$ Ohms, then the patch cord $S_{11p}$ and $S_{22p}$ are non-zero and are then replaced by non-zero values calculated by using standard transmission line theory.

Finally, the measured LAN cable data with reference to plane 2, is related to plane 3, through the use of, $[S]_{Patchcord}$, the patch cord scattering matrix.

$$[S]_{Patchcord} = \begin{bmatrix} 0 & e^{-j\phi Line} \\ e^{-j\phi Line} & 0 \end{bmatrix}$$

From this matrix it can be seen that for a well-matched patch cord, the usual case, there is no effect upon the $S_{11}$ and $S_{22}$ mated connector pair terms. The only effect to the mated connector pair scattering matrix is the added phase term, $e^{-j\phi Line}$.

Thus, with the patch cord NVP known by measurement or specification, the measurement reference plane may be moved through the mated connector pair on the channel link adapter board and down the patch cord a specified number of inches from plane 2, at the output of the mated connector pair.

Figure 17:
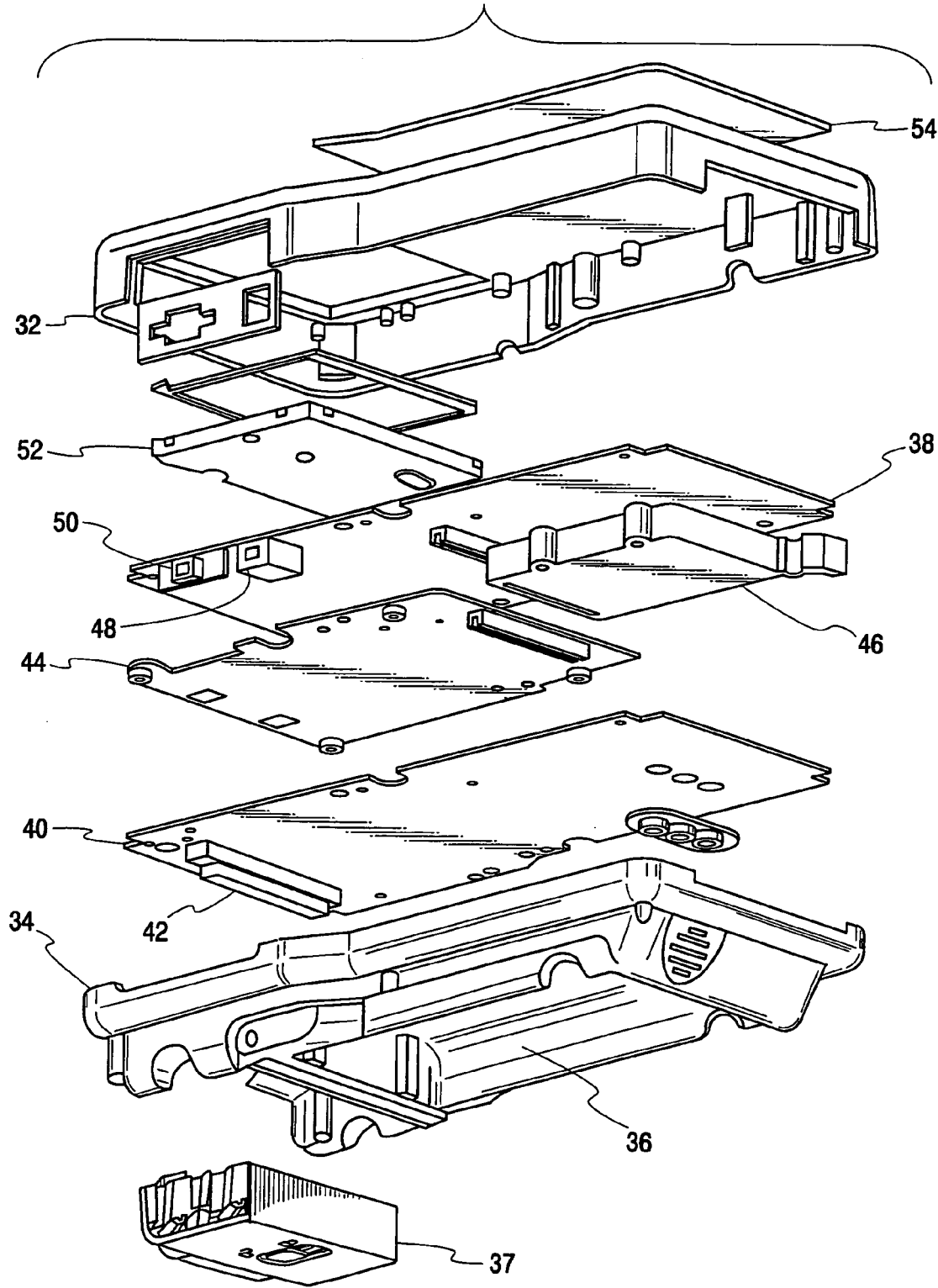
FIG. 17 is an exploded perspective view of the LAN tester display unit of the present invention.
Figure 18:
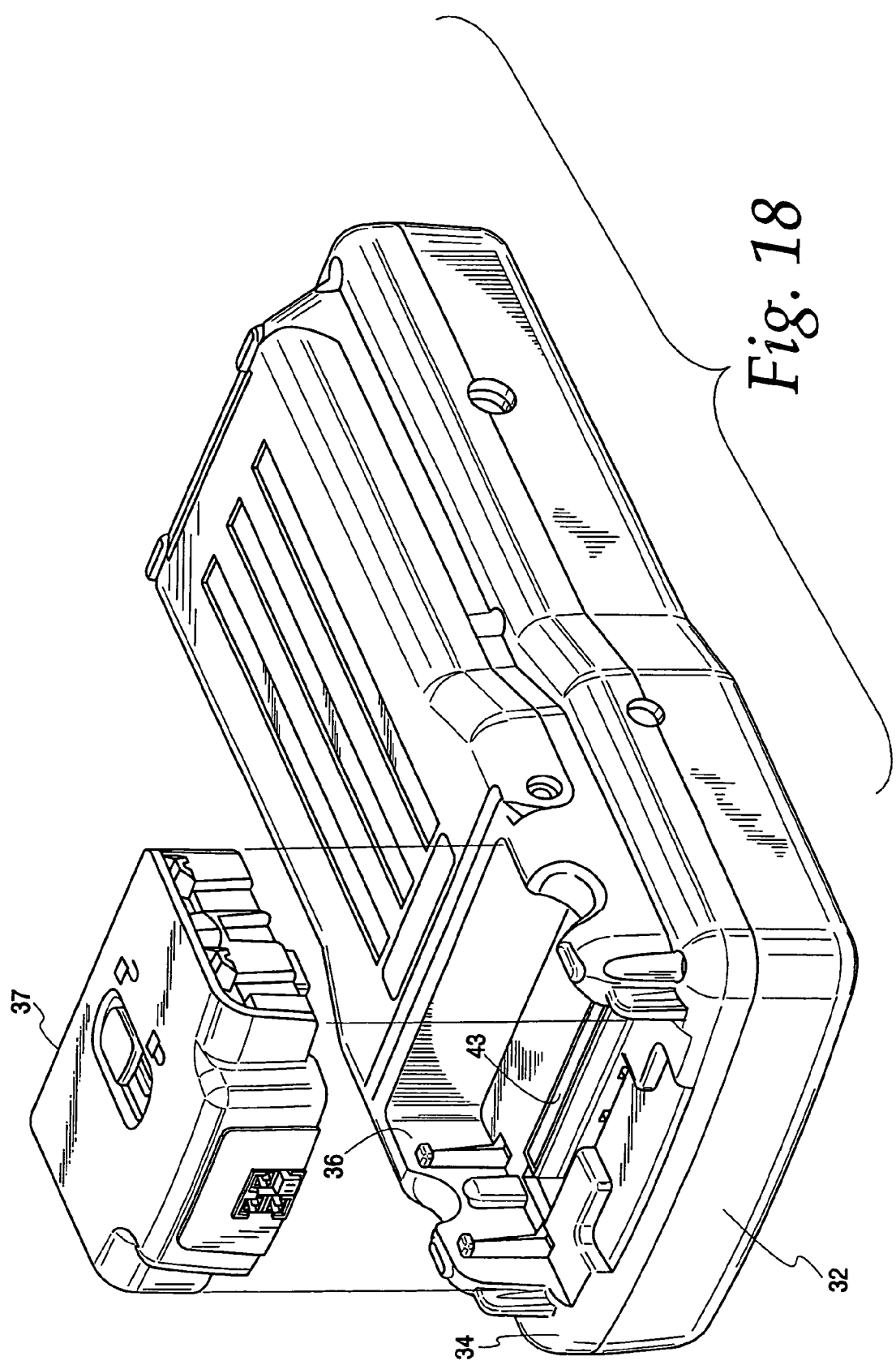
FIG. 18 is an exploded perspective view of the underside of the tester unit.

Turning now to a more detailed description of the tester units, the exploded views of FIGS. 17 and 18 show the overall physical configuration of the tester and show how its printed circuit boards are housed. The tester shown is a display unit 10. It will be understood that the remote unit is similar. The tester has a housing including a front enclosure 32 and a rear enclosure 34. The rear enclosure defines a receptacle or well 36 for receiving and mounting a channel link adapter printed circuit board 37. Inside the housing there is a digital control module 38 that drives and controls an analog stimulus/measurement module 40. Both modules are built into printed circuit boards and will be referred to herein as the digital board and the analog board. The analog board 40 includes a connector 42 on the underside thereof. This connector is releasably engageable with a mating connector on the channel link adapter through an opening 43 in the rear enclosure at the bottom of the well 36. A time domain reflectometer (TDR) 44 measurement capability is provided by a third separate module. Other components shown in FIG. 17 include a PCMCIA card holder 46, a universal serial bus (USB) port 48 and a serial port 50. These are mounted on the digital board 38. A color display unit 52 and a keyboard 54 are mounted on or in the front enclosure 32. Further details of the physical arrangement of the housing may be as shown and described in U.S. patent application Ser. No. 09/863,810, filed May 22, 2001 entitled "Apparatus with Interchangeable Modules for Measuring Characteristics of Cables and Networks", the disclosure of which is incorporated herein by reference.

Figure 19:
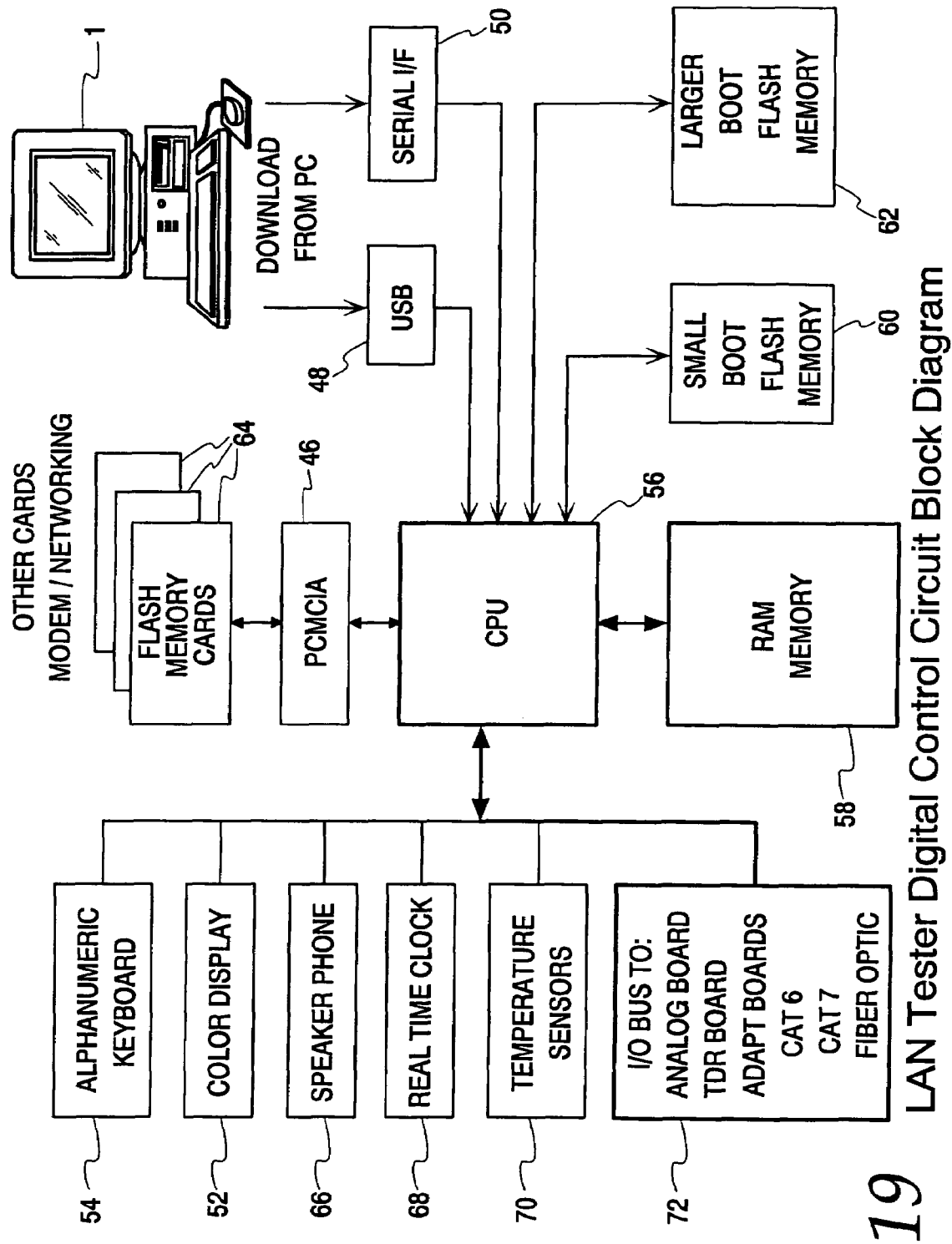
FIG. 19 is a block diagram of the digital control circuit board of a LAN tester unit of the present invention.

The overall function of the digital control module 38 is shown in the digital control circuit block diagram of FIG. 19. The digital board is controlled by a high-speed central processing unit (CPU) 56 driven by the firmware installed within the tester. Several memory blocks (not shown) may be provided, as well as a RAM memory 58, a small boot flash memory 60, and a larger boot flash memory 62. The tester communicates with an external personal computer (PC) 1 either by using the USB 48, or with a serial interface connection 50 to the CPU 56. Flash memory or networking cards 64 can be installed in the tester, which connect to the CPU through the PCMCIA block 46. These cards can be used to store additional test results, or to upload new firmware to the CPU. Other connections to or from the CPU include the keyboard 54, the color display 52, a speaker phone 66, a real time clock 68 and temperature sensors 70 to compensate the analog board performance as temperature rises.

Of utmost importance is communication with the analog board 40 through the I/O bus 72. This bus is shown as a separate block because it interfaces control commands to the analog board 40 from the digital board 38, and it returns measured data from the analog board for storage in the display unit memory and for display on the color display 52.

Figure 20:
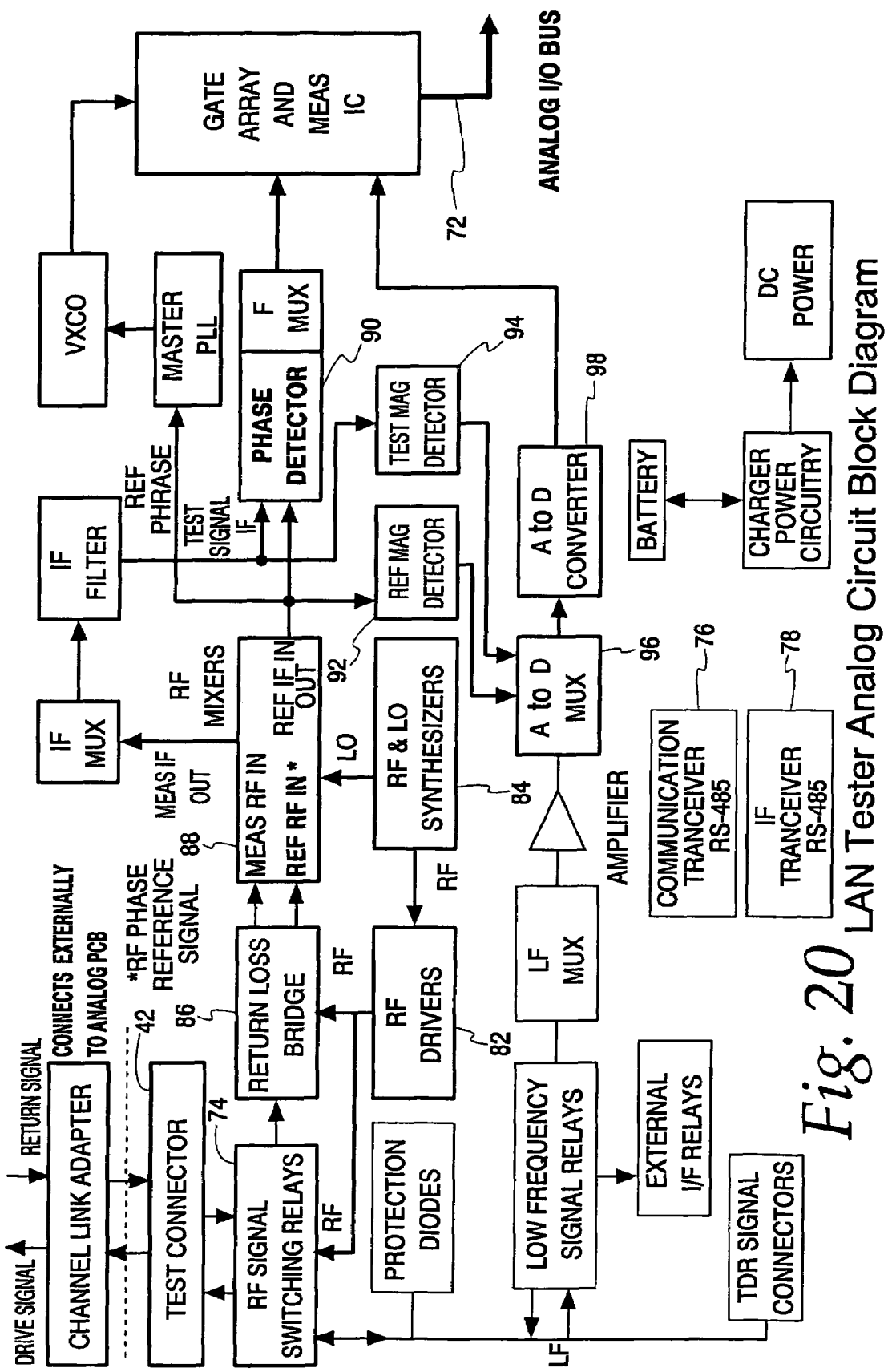
FIG. 20 is a block diagram of the analog circuit board of the present invention.

The LAN tester analog circuit block diagram of FIG. 20 shows the major functional blocks on the analog board 40. Other blocks have been omitted for clarity. The analog board generates a set of continuously varying low frequency (LF) and radio frequency (RF) signals which are applied to one selected conductor pair of the LAN cabling through the use of signal switching relay banks 74 on the analog board. The same relay banks carry the return signal to be measured from another selected LAN cable conductor pair back into the analog board. Circuit blocks on the analog board then condition the return test signal and measure its characteristics relative to the applied drive signal. The low frequency LF measurements include cable capacitance, length, conductor wire DC resistance, wire mapping and delay. The circuit blocks associated with these lower frequency signals are identified by the associated notation.

Note the notation of "MUX" several places in the block diagram. A MUX is shorthand notation for a multiplexer, which is a switching device that routes an input of several different signals to a selected signal path. The LAN tester analog board uses several MUX's since it is a four-channel test instrument, capable of testing two of the possible four conductor pairs of the LAN cable under test. The MUX's are required for signal routing and channel to channel signal isolation.

Circuit blocks 76, 78 are shown for RS-485 blocks, one for communication, and another for LAN tester interface with the gate array and measurement IC 80, and for DC power control and power management on the analog board.

The analog board 40 also measures the RF parameters of cable crosstalk, return loss and attenuation. Specifically the analog board measures the ratio of the amplitude of the returned signal divided by the amplitude of the RF drive signal. Circuitry has been added to the analog board in the unit to measure the phase of the returned test signal relative to the RF drive signal sent out on the selected conductor pair.

The RF drivers 82 send a signal from the RF synthesizer 84 out on one pair of the LAN cable conductors via the RF signal switching relays 74. The drive signal is also sent to the return-loss bridges 86.

The resulting test signal comes into the tester via the same set of RF relays 74 and is routed through the return-loss bridges 86 to the RF mixer block 88. There it is mixed with the local oscillator (LO) signal and converted into the test IF (intermediate frequency) signal.

As mentioned above, the RF drive signal is also sent into the return-loss bridges 86. As shown in FIG. 20, the drive signal sent to the return-loss bridges enters the mixer 88 and is converted to a phase reference IF signal. All IF signals associated with the LAN measurement are compared with this phase reference IF signal to determine the phase of that measurement signal.

Once both the Ref IF and Test IF signals have been created they are delivered to the phase detector 90 and the reference and test magnitude detector blocks 92 and 94. The phase detector block 90 sends the phase information into the gate array and measurement IC 80. The outputs from the reference and test magnitude detectors 92, 94 are sent to the analog-to-digital (A to D) Mux 96 and then to the A to D converter 98. From there the magnitude ratio signal is sent to the gate array and measurement IC (integrated circuit) 80.

The gate array and measurement IC 80 finishes the computation of the phase between the test and reference IF signals, and the ratio of their amplitudes, to formulate a complex number representation of the measurement. Output from the IC 80 is placed on the analog I/O bus 72, which communicates with the digital board 38. Thus, the phase measurement function for the testing unit is controlled from the digital board, but is measured and computed on the analog board. The measurement results are then carried to the digital board from the analog board.

Figure 21:
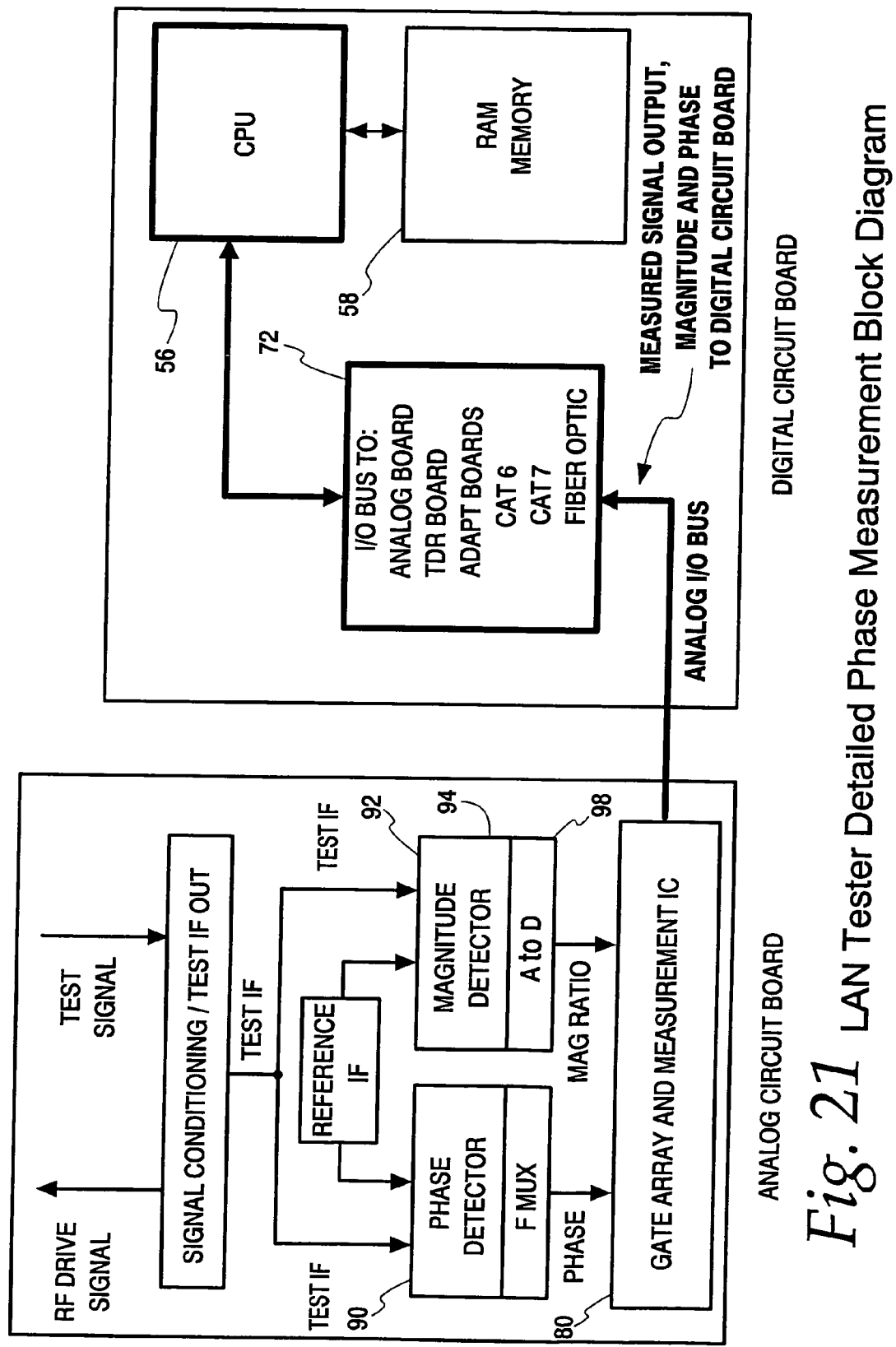
FIG. 21 is a detailed phase measurement block diagram of the present invention.

The LAN tester phase measurement block diagram of FIG. 21 shows this function on a phase measurement system level. This block diagram also shows computation of the magnitude ratio on the analog board. The I/O bus 72 carries the control signals from the digital board to the analog board, and it also carries both the phase and magnitude of the test signals to the digital board. Once the test signal has been delivered to the display board it can be stored in the memory or shown in color graphic form, plotted on the display screen 52.

Regarding measurement speed, the tester architecture has been designed in such a manner that a LAN cable conductor pair may be driven with RF signals from either the display or remote test units 10 or 12. All other non-driven lines may then be simultaneously connected to the measurement circuitry via the MUX circuitry on the analog boards within each unit. This design feature provides for significantly reduced test times, while still providing measurement of test signal magnitude and phase.

In another aspect of the invention, the LAN tester as described above could be operated in a so-called dual mode. Briefly, in dual mode the LAN tester will measure once but produce two test results in nominally the same time as it takes to produce one test result. In other words, the user will press a test button one time and the tester will produce both channel link test results and permanent link test results. These results could be displayed as selected by the user.

Dual mode measurement for the LAN tester of the present invention follows directly from its ability to measure both magnitude and phase, as described above. Looking again at FIG. 9, it will be noted that the measurement reference plane is set at plane 1 in both the display end unit 10 and the remote end unit 12. This location is set during factory calibration of the units and it is the starting point for LAN link measurements in the field. This reference plane remains within the units and is always used as a starting point for link measurements related to phase.

As set forth above, field calibration determines the properties of the patch cord cordage 14B, 16B and the properties of the mated pairs 14A/20 and 16A/28 of patch cord plugs and CLA jacks. This procedure determines the patch cord physical length, its NVP, and the amount of signal attenuation or loss as a signal passes through the length of the patch cord. The display end and remote end patch cords are each characterized during field calibration. As indicated, field calibration results are used to determine the properties of the mated plug/jack at the CLA's for both the display and remote end units in addition to characterizing the signal properties related to the patch cord cordage vs. frequency.

In dual mode the LAN tester measures the total link in the field. The total link includes everything between reference planes 1 in FIG. 9, namely, the mated plug/jack pairs at each CLA, the patch cord cordage, the mated plug/jack pairs at the walls, and the link running inside the walls. Then the software de-embeds the mated plug/jack pairs 14A/20 and 16A/28 at the display end unit and remote end unit. This can be done since the characteristics of those plug/jack pairs are known. This in effect moves the phase measurement reference to planes 2 in FIG. 9, which is at the start of the channel link measurement configuration. De-embedding the plug/jack pairs 14A/20 and 16A/28 provides the channel link measurement. Note that after de-embedding these plug/jack pairs from the total link measurement what is left is the channel link measurement.

Once the channel link measurement is defined by the first de-embedding, a second de-embedding step is performed to move the phase measurement reference plane to planes 4 in FIG. 9. The result of the second de-embedding is the permanent link measurement. Thus, after calibration only one link measurement is taken in the field, that for the total link. From the total link measurement set, the LAN tester can determine the properties for both channel link and permanent link through de-embedding techniques, which are made possible by the phase measurement circuitry of the present invention.

Figure 22:
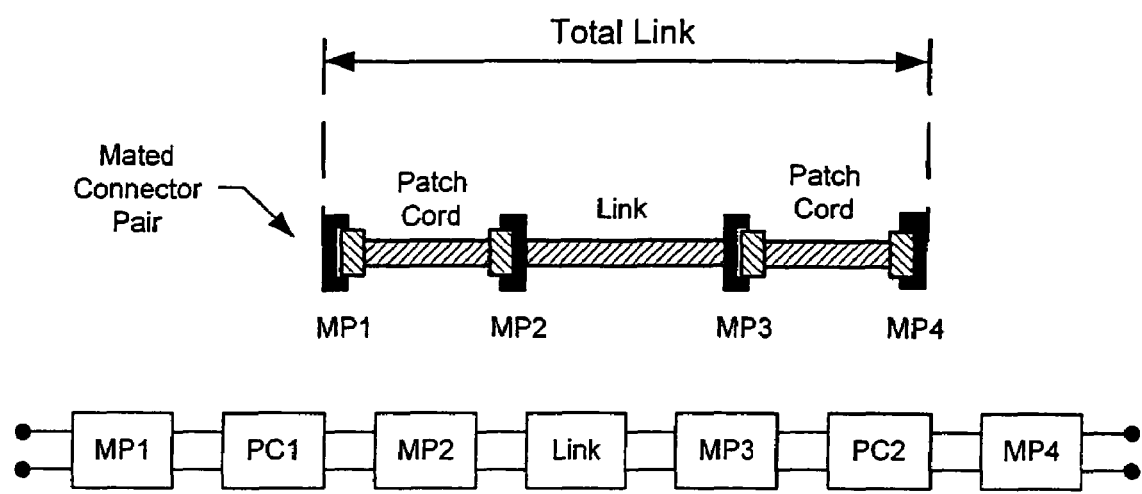
FIG. 22 is a diagram of a total link and its equivalent cascade of linear, two-port networks.

Since the LAN tester of the present invention has been designed to measure phase, the tester uses this capability to measure LAN links in a time efficient manner by treating links as a cascade of linear, two-port networks, as shown in FIG. 22.

In FIG. 22 the total link consists of the mated connector pair MP1 at the display unit 10, the mated connector pair MP4 at the remote unit 12, the patch cord cordage of each patch cord, PC1 and PC2, the mated connector pairs at each end of the link, MP2 and MP3, and the link itself. This is what the LAN tester measures in the field. There is a set of four of these cascaded two-ports, one each for Line Pair A, B, C, and D.

The LAN tester performs its analysis and operations on all four of these equivalent cascade models for the total link.

During field calibration, the LAN tester determines the two-port circuit properties for MP1, PC1, PC2 and MP4 using scattering parameters. Then with established de-embedding techniques, the LAN tester resolves this cascade connection to solve for the properties of the channel and permanent link from the total link measurement. This resolution is performed upon Line Pairs A, B, C, and D to solve for the properties of the channel and permanent link.

Dual mode offers significant time and cost savings for installers and LAN cable installation vendors since only one link measurement is required to determine both channel link and permanent link performance. If a hard-wired PLA and a second, separate CLA were used, two separate measurements would be required. Dual mode requires just one measurement.

Preferably, the LAN tester performs its linear two-port circuit analysis using scattering, or [S] parameters. However, it will be understood that this analysis and de-embedding can also be done using other, established two-port circuit parameters such as [ABCD]-matrix, [Z]-matrix, [Y]-matrix, and [H]-matrix network parameter representations. With phase measurement, the LAN tester can also perform its analysis and de-embedding using parameters from any one or a combination of these [ABCD], [Z], [Y], and [H] matrix network parameter representations or other linear two-port network parameter representations.

While a preferred form of the invention has been shown and described, it will be realized that alterations and modifications may be made thereto without departing from the scope of the following claims.

We claim:

1. In a LAN cabling testing system of the type having a display unit and a remote unit and first and second patch cords, the patch cords each terminating at first and second plugs, and the display and remote units each having a jack for receiving a patch cord plug, a plug and jack when connected comprising a mated connector pair, the display and remote units each having means for sending and receiving a wave form of selected frequency to and from the other unit through said patch cords and a LAN link to be tested, an improved method of testing LAN cabling comprising the steps of:
   a) calibrating the patch cords and mated connector pairs, calibration including the step of measuring the scattering parameters of the mated connector pairs and the patch cords;
   b) connecting the first patch cord to the display unit and one end of the link to be tested, and connecting the second patch cord to the remote unit and to the other end of the link to be tested;
   c) measuring the total link;
   d) using the scattering parameters of the mated connector pairs to move the reference planes at the display unit and remote unit to the necessary locations for performing channel link testing and storing or displaying the channel link results; and
   e) using the scattering parameters of the mated connector pairs and the patch cords to move the reference planes at the display unit and remote unit to the necessary locations for performing permanent link testing and storing or displaying the permanent link results.

2. In a LAN cabling testing system of the type having a display unit and a remote unit and first and second patch cords, the patch cords each having cordage terminating at first and second plugs, and the display and remote units each having a jack for receiving a patch cord plug, a plug and jack when connected comprising a mated connector pair, the display and remote units each having means for sending and receiving a wave form of selected frequency to and from the other unit through said patch cords and a LAN link to be tested, an improved method of testing LAN cabling comprising the steps of:
   a) measuring the characteristics of the patch cords and mated connector pairs;
   b) connecting the first patch cord to the display unit and one end of the link to be tested, and connecting the second patch cord to the remote unit and to the other end of the link to be tested;
   c) measuring the characteristics of the total link;
   d) calculating channel link measurements by de-embedding from the total link measurements the characteristics of the mated connector pairs; and
   e) calculating permanent link measurements by de-embedding from the channel link calculation the characteristics of the patch cord cordage.

3. The method of claim 2 further comprising the step of storing the channel link calculation.

4. The method of claim 2 further comprising the step of storing the permanent link calculation.

5. The method of claim 2 further comprising the step of comparing the channel link calculation with a selected industry standard and displaying a pass or fail indication based on said comparison.

6. The method of claim 2 further comprising the step of comparing the permanent link calculation with a selected industry standard and displaying a pass or fail indication based on said comparison.

7. A LAN cabling testing system, comprising:
   first and second patch cords each including cordage and terminating at first and second plugs;
   a hand-held display unit and a hand-held remote unit, each one of said units including means for sending and receiving a wave form of selected frequency to and from the other of said units through said patch cords and a LAN link to be tested;
   the hand-held display unit including a jack for receiving a plug of one of the patch cords, said jack and plug defining a first mated connector pair;
   the hand-held remote unit including a jack for receiving a plug of the other of the patch cords, said jack and plug defining a second mated connector pair;
   phase measuring means for measuring phase in one of the display or remote units; and
   wherein one of the display unit and remote unit further comprises electronic storage means for storing the characteristics of the mated connector pairs, and calculating means programmed to de-embed the connector pairs characteristics from a total link measurement to calculate the channel link measurements.

8. The LAN tester of claim 7 wherein the electronic storage means further stores the characteristics of the cordage of the patch cords and the calculating means is programmed to de-embed the cordage characteristics from the calculated channel link measurement to calculate the permanent link measurements.

9. A LAN cabling testing system, comprising:
   first and second patch cords each terminating at first and second plugs;
   a hand-held display unit and a hand-held remote unit, each one of said units including means for sending and receiving a wave form of selected frequency to and from the other of said units through said patch cords and a LAN link to be tested;

the hand-held display unit including a jack for receiving a plug of one of the patch cords, said jack and plug defining a first mated connector pair;

the hand-held remote unit including a jack for receiving a plug of the other of the patch cords, said jack and plug defining a second mated connector pair;

phase measuring means for measuring phase in one of the display or remote units; and wherein one of the display unit and remote unit further comprises electronic storage means for storing the two-port performance representation of the patch cords and the mated connector pairs, and calculating means programmed to use the stored two-port performance representation to move the phase reference planes to the necessary locations for performing channel link or permanent link testing.

10. In a LAN cabling testing system of the type having a display unit and a remote unit and first and second patch cords, the patch cords each terminating at first and second plugs, and the display and remote units each having a jack for receiving a patch cord plug, a plug and jack when connected comprising a mated connector pair, the display and remote units each having means for sending and receiving a wave form of selected frequency to and from the other unit through said patch cords and a LAN link to be tested, an improved method of testing LAN cabling comprising the steps of:

a) calibrating the patch cords and mated connector pairs, calibration including the step of measuring the two-port performance representation of the mated connector pairs and the patch cords;

b) connecting the first patch cord to the display unit and one end of the link to be tested, and connecting the second patch cord to the remote unit and to the other end of the link to be tested and shooting the link to be tested; and c) using the two-port performance representation of the mated connector pairs and the patch cords to move the reference planes at the display unit and remote unit to the necessary locations for performing channel link or permanent link testing.

11. A LAN cabling testing system, comprising first and second patch cords each terminating at first and second plugs, a hand-held display unit and a hand-held remote unit each including a channel link adapter card having a jack suitable for receiving a plug of a patch cord, each one of said units including means for sending and receiving a wave form of selected frequency to and from the other of said units through said patch cords and a LAN link to be tested, at least one of the display unit and remote unit including phase measuring means for measuring phase in one of the display or remote units, said one of the display or remote units further comprising an electronic storage means for storing a two-port performance representation of the patch cords and mated plug and jack pairs, and calculating means programmed to use the stored two-port performance representation to move the phase reference planes along the patch cords such that channel link and permanent link tests can be made using the channel link adapter card.

12. In a LAN cabling testing system of the type having a display unit and a remote unit and first and second patch cords, the patch cords each terminating at first and second plugs, and the display and remote units each having a jack for receiving a patch cord plug, a plug and jack when connected comprising a mated connector pair, the display and remote units each having means for sending and receiving a wave form of selected frequency to and from the other unit through said patch cords and a LAN link to be tested, an improved method of testing LAN cabling comprising the steps of:

a) calibrating the patch cords and mated connector pairs, calibration including the step of measuring the two-port performance representation of the mated connector pairs and the patch cords;

b) connecting the first patch cord to the display unit and one end of the link to be tested, and connecting the second patch cord to the remote unit and to the other end of the link to be tested;

c) measuring the two-port performance representation for the total link; and d) de-embedding the two-port performance representations of the mated connector pairs from the total link measurement to calculate the channel link characteristics.

13. The method of claim 12 further comprising the step of de-embedding the two-port performance representations of the patch cords from the channel link characteristics to calculate the permanent link characteristics.

14. The method of claim 13 wherein the steps of measuring the two-port performance representations are further characterized by using two-port circuit parameters selected from the group of [S], [ABCD], [Z], [Y], and [H]-matrix network parameters.

15. The method of claim 12 wherein the steps of measuring the two-port performance representations are further characterized by using two-port circuit parameters selected from the group of [S], [ABCD], [Z], [Y], and [H]-matrix network parameters.

* * * * *